United States Patent [19]

Brown

[11] 4,385,462
[45] May 31, 1983

[54] ILLUMINATED TRANSPARENCY VIEWING SYSTEM WITH OVERLAY DEVICE AND FILM CLIPS

[75] Inventor: Donald J. Brown, Naperville, Ill.

[73] Assignee: Knox Manufacturing Co., Wood Dale, Ill.

[21] Appl. No.: 63,951

[22] Filed: Aug. 6, 1979

Related U.S. Application Data

[63] Continuation of Ser. No. 868,985, Jan. 12, 1978, abandoned.

[51] Int. Cl.³ .......... G02B 27/02; G09F 1/10; A47B 19/00
[52] U.S. Cl. .................... 40/361; 40/158 B; 248/441 A
[58] Field of Search .......... 40/158 R, 158 B, 361, 40/362, 363, 364, 365, 366, 367, 152.1, 152.2; 248/441, 441 A, 441 B, 441 C

[56] References Cited

U.S. PATENT DOCUMENTS

| | | | |
|---|---|---|---|
| 1,500,867 | 7/1924 | Glover | 40/361 |
| 2,682,463 | 6/1954 | Olsen | 430/22 |
| 3,422,547 | 1/1969 | Heine | 434/349 |
| 3,541,711 | 11/1970 | Ohlson et al. | 40/361 |
| 3,559,320 | 2/1971 | Ohlson | 40/361 |
| 3,724,111 | 4/1973 | Grieger | 40/361 |
| 3,802,102 | 4/1974 | Licciardi | 40/564 |
| 4,152,852 | 5/1979 | Brown | 40/361 |

Primary Examiner—Robert Peshock
Assistant Examiner—Michael J. Foycik, Jr.
Attorney, Agent, or Firm—Wegner, McCord, Wood & Dalton

[57] ABSTRACT

A transparency viewing system employs an illuminated viewer adapted to be used with an overlay device and/or film retaining clips. Brackets are provided to define longitudinal open channels at opposite edges of the illuminated viewing surface. The overlay device is of a size to span the viewing surface such that the marginal edges thereof, which have a configuration similar to that of the open channels, may be inserted into the open channels so that the overlay device is held against the viewing surface. Each retaining clip includes a mounting portion having a configuration similar to that of the channels and may be adjustably positioned along the channels so that its operating portion is biased against the viewing surface to hold transparencies placed between the clip and the viewing surface in position. The brackets are secured to the housing at respective opposite edges to fix the viewing surface in place at the upper edge thereof and has a depending portion extending inwardly from the edges of the viewing surface to overlie the viewing surface so that the channel side walls are defined by the viewing surface and the bracket depending portion.

17 Claims, 18 Drawing Figures

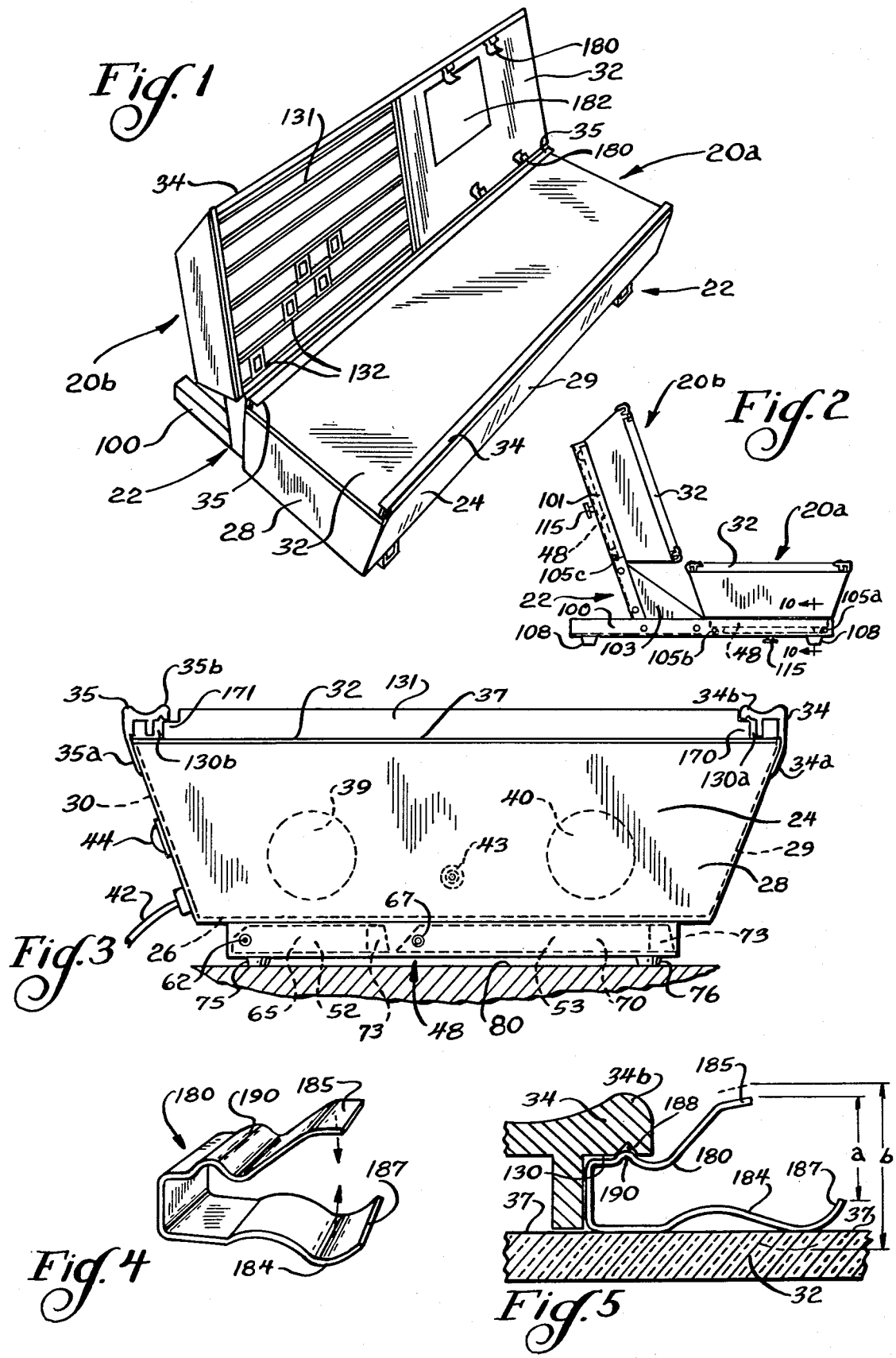

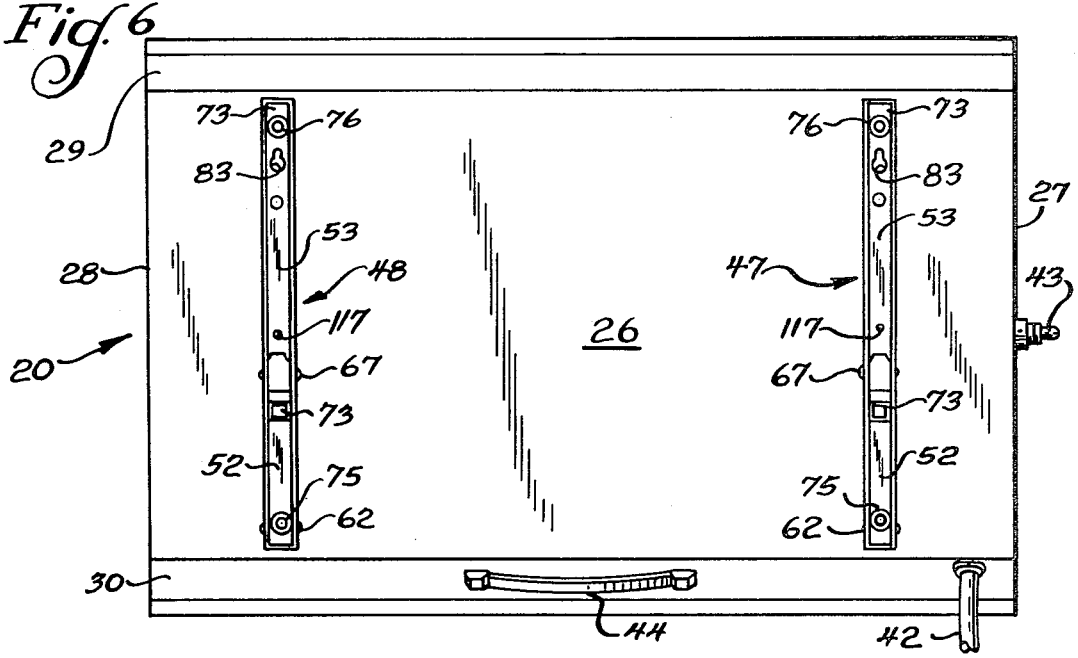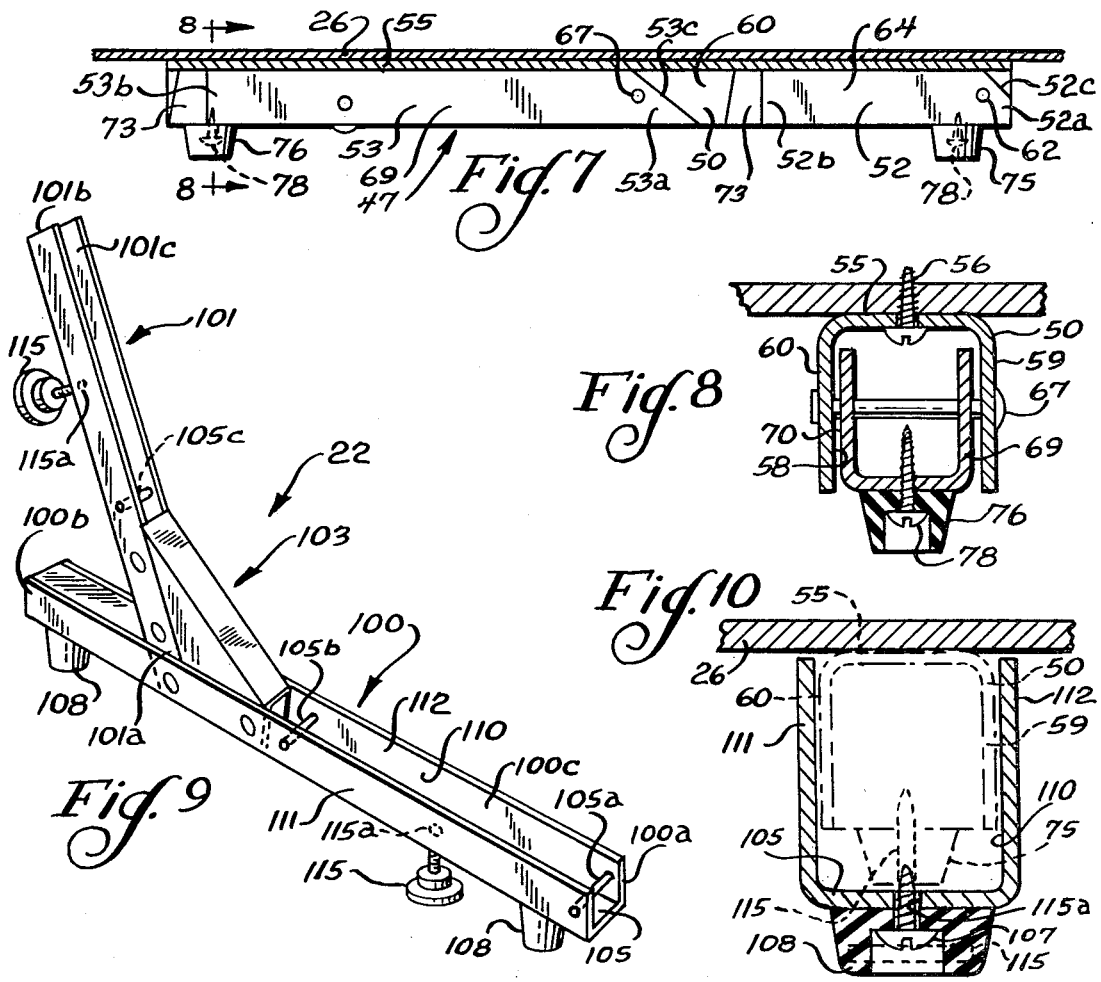

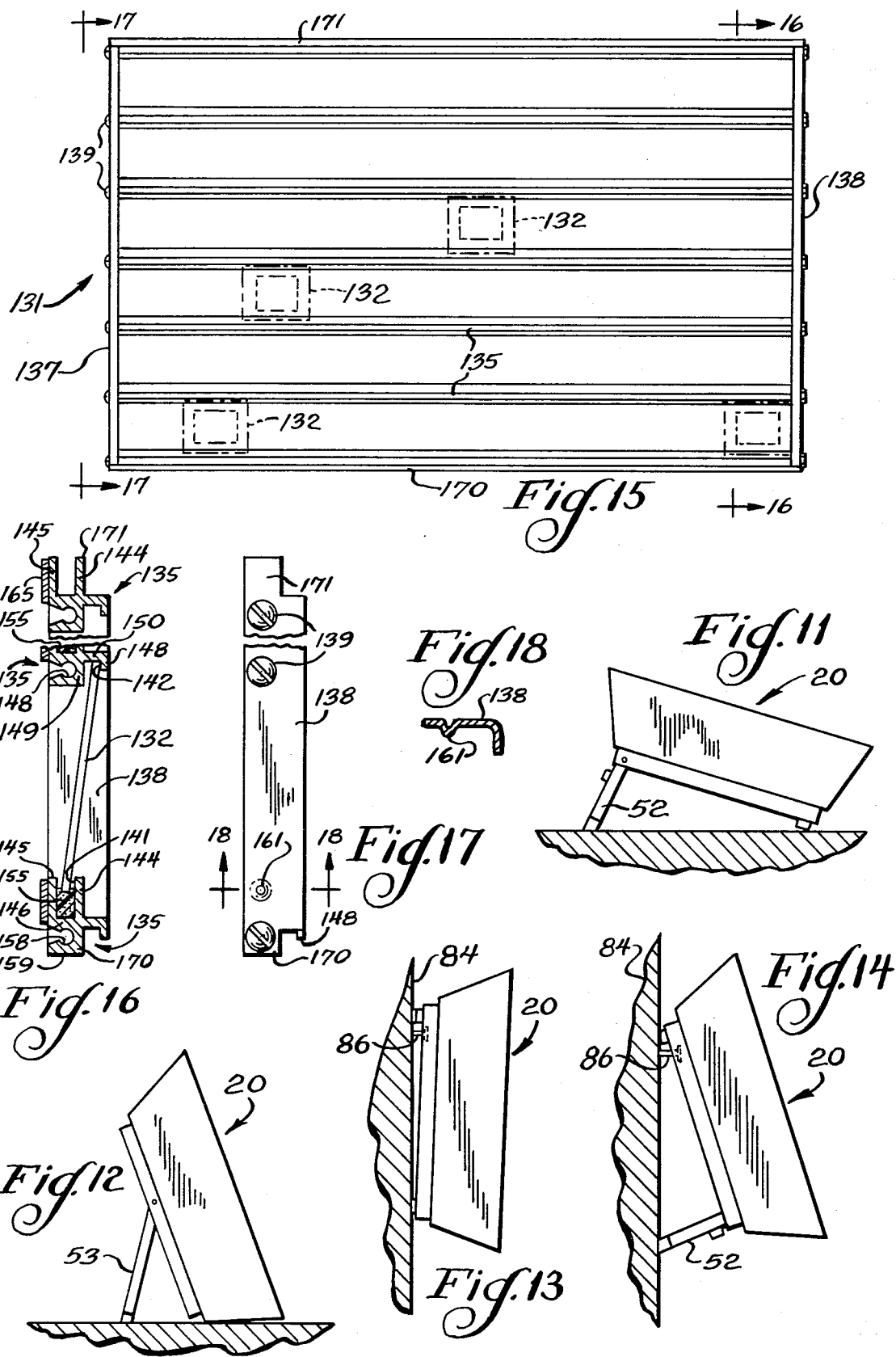

4,385,462

ILLUMINATED TRANSPARENCY VIEWING SYSTEM WITH OVERLAY DEVICE AND FILM CLIPS

This is a continuation of application Ser. No. 868,985 filed Jan. 12, 1978 abandoned.

BACKGROUND OF THE INVENTION

This invention relates to a transparency viewing system and, more particularly, to a transparency viewer adapted for selective use with an overlay device and/or a plurality of film clips.

Illuminated transparency viewers, or light boxes, commonly have a light source for providing a strong uniform light on a translucent surface to enable negative transparencies, slides and the like to be conveniently examined. Typically, such viewers are employed for editing or sorting and sequencing of such transparencies and slides.

Particularly, when the viewer is mounted to provide a vertical or near vertical viewing surface, slides cannot easily be sorted without providing some means for holding them in position. In the prior art, overlay devices have been designed to be positioned to overlie the illuminated surface of the viewer and support slides. Such overlays have usually been supported on a ledge or shelf to rest loosely against the illuminated surface when tilted rearwardly thereagainst.

Film clips have also been used in connection with the illuminated viewing surface to retain or hold a transparency against the translucent surface. These clips are biased against the viewing surface so that transparencies placed between a clip and the viewing surface were held in place. Usually, these clips were used at the upper edge of the viewer when the viewing surface was vertically disposed. Oftentimes, such retaining clips were fixed in place so that they could not be adjusted or additional clips added.

SUMMARY OF THE INVENTION

It is a principal object of the present invention to provide an illuminated transparency viewing system in which the viewer may easily and conveniently be utilized with either an overlay or film clips as desired.

In accordance with the invention, a transparency viewer is constructed so that open longitudinal channels are defined at the forward and rearward edges of the translucent surface to permit an overlay with forward and rearward marginal edges having a cross section similar to that of the channels, or retaining clips having similarly configured mounting portion, may be inserted into the open ends of the channels and slid across the face of the translucent surface so that they are held in place thereby until adjusted by the user.

In an exemplary embodiment of the invention, each channel is defined by a mounting bracket which is secured to the housing, one at the forward and rearward edges and adapted to secure the translucent surface to the housing. The bracket has a depending portion spaced from the translucent top surface and extending thereover so that the walls of the channel are defined by the translucent surface and the bracket depending portion.

To increase retention of the retaining clips within the channel, the wall of the bracket spaced from the translucent surface has a longitudinal groove formed therein and the retaining clips is provided with a projection which will mate with the groove, so that the clip may not be pulled out from the channel. However, because the clip is U-shaped, the clip may be compressed to move the projection out of the groove which otherwise does not permit the clip to be moved directly out of the channel. The groove is designed not to interfere with the overlay when the marginal edges thereof are inserted in the respective channels.

BRIEF DESCRIPTION OF THE DRAWINGS

FIG. 1 is a perspective view of two transparency viewers mounted on a frame to provide horizontal and vertical viewing potential;

FIG. 2 is a side elevational view of the two transparency viewers and the frame shown in FIG. 1;

FIG. 3 is a side elevational view of a single transparency viewer positioned on a horizontal surface;

FIG. 4 is an enlarged perspective view of a clip which may be used in connection with the transparency viewer to hold transparencies thereon;

FIG. 5 is an enlarged, fragmentary, cross-sectional view of the clip of FIG. 4 disposed in a groove defined between the viewer frame and the translucent sheet;

FIG. 6 is a bottom plan view of the transparency viewer of FIG. 3 showing the disposition of the leg assemblies;

FIG. 7 is a side elevational view of a leg assembly shown in FIG. 6 with certain side parts broken away to show the small and large pivoted legs in nested position;

FIG. 8 is an enlarged, cross-sectional view taken along line 8—8 of FIG. 7 showing one of the leg assemblies secured to the bottom of the transparency viewer;

FIG. 9 is a perspective view of one of the frame assemblies which supports the transparency viewers in FIG. 1;

FIG. 10 is an enlarged cross-sectional view of the frame assembly and leg assembly taken along line 10—10 of FIG. 2 showing the relationship thereof when engaged;

FIG. 11 is a schematic diagram showing the short legs extended to tilt the transparency viewer at a slight angle from horizontal;

FIG. 12 is a schematic diagram showing the long legs extended to tilt the transparency viewer at a greater angle than shown in FIG. 11;

FIG. 13 is a schematic diagram showing the transparency viewer mounted against a wall surface;

FIG. 14 is a schematic diagram showing the short legs extended to tilt the transparency viewer slightly away from the wall;

FIG. 15 is a front elevational view of the overlay shown with the transparency viewers in FIG. 1 and 3;

FIG. 16 is an enlarged cross-sectional view of the overlay taken along line 16—16 of FIG. 15 showing configuration of the overlay channel members and a slide held therebetween;

FIG. 17 is an enlarged side elevational view of the overlay of FIG. 15 taken along line 17—17; and FIG. 18 is an enlarged, cross-sectional view of the end piece secured at the opposite ends of the channel members taken along line 18—18 of FIG. 17.

DESCRIPTION OF THE PREFERRED EMBODIMENT

Referring to FIGS. 1-3, transparency viewers, designated 20, are illustrated in combination (FIGS. 1 and 2) and singly (FIG. 3). Although each transparency viewer is constructed similarly, for clarity herein, the horizontal viewer will be designated 20a and the rear, uprightly disposed viewer will be designated 20b. As will be described in more detail hereinafter, when the transparency viewers are used in combination, two frame assemblies, each generally designated 22, support one transparency viewer 20a in a horizontal position and a second transparency viewer 20b in an inclined upright position.

The transparency viewer 20 generally includes a metal housing 24 configured to define a bottom wall 26, spaced apart side walls 27 and 28, and inclined front and rear walls 29 and 30, respectively. The upper end of the housing 24 is closed by a rectangular flat sheet of translucent material 32, such as plexiglass. The translucent sheet 32 is supported on the upper edges of the side walls 27 and 28, the front wall 29 and the rear wall 30, and is secured in place by a pair of elongate retainer brackets 34 and 35 which overlie the upper surface 37 of the translucent sheet 32 and are secured, as by screws (not shown), respectively to the front wall 29 and to the rear wall 30.

Illuminating means, such as fluorescent tubes 39 and 40, generally extending between the side walls 27 and 28 within the housing 24 provide a conventional light source, preferably of nearly white coloration. The tubes are actuated by a source of electric power through cord 42 which may be externally controlled by push-button switch 43 carried by the side wall 27. A handle 44 may be mounted on the rear wall 30 to provide a convenient means for carrying the viewer.

1. Supporting Leg Assembly For a Transparency Viewer

The supporting leg assemblies, generally designated 47 and 48, are best seen in FIGS. 6–8 and 11–14. The supporting leg assemblies 47 and 48 are each spaced apart on the exterior of the bottom wall 26 and each extends preferably in parallel fashion generally between the respective edges of the front wall 29 and the rear wall 30. Because each of the supporting leg assemblies 47 and 48 is similarly constructed, in the interest of brevity and clarity, only one will be described in detail.

The supporting leg assembly 47 broadly preferably includes a channeled bracket or leg support 50, affording a U-shaped cross section together with a short leg 52 and a long leg 53, each also preferably being of U-shaped cross section.

The leg suppot 50 is positioned on the bottom wall 26 so that its center portion 55 rests against the exterior surface of the bottom wall 26 and is secured thereto by one or more screws 56 so that a downwardly opening channel 58 is defined by the downwardly depending side walls 59 and 60 of the leg support 50.

The colinearly arranged legs 52 and 53 may have an orientation opposite that of the leg support 50 and are of such size as to be nestably disposed within the open channel 58. The leg 52 is relatively short and has a rearward end 52a which is pivotally mounted to side walls 59 and 60 within the channel 58 at the rearward end thereof by a rivet 62 which extends through the side walls 59 and 60 of the leg support 50 and through the side walls 64 and 65 of the leg 52. Similarly, the relatively long leg 53 is pivotally mounted with the channel 58 by a rivet 67 which passes through the side walls 59 and 60 of the support 50 and through the side walls 69 and 70 of the leg 53 adjacent the end 53a thereof. The free ends 52b and 53b of the legs 52 and 53, respectively, are fitted with end caps 72 and 73, respectively. Rubber grommets 75 and 76 function as resilient feet and are secured adjacent the end 52a of the leg 52 and the end 53b of the leg 53 by screws 78.

As seen in FIG. 3, the transparency viewer 20 is horizontally disposed on a flat supporting surface by retracting or pivoting the legs 52 and 53 into nested position with respect to the channel 58 of the leg support 50 so that the grommets 75 and 76 support the viewer 20 on the horizontal surface 80. By pivotally mounting the short legs 52 at the rear of the housing 24 and the long legs 53 near the center of the housing 24, the degree of adjustments is increased for a predetermined leg length. To tilt the viewer at an angle of approximately 15° relative to horizontal as seen in FIG. 11, each short leg 52 is extended by pivoting it downwardly out of the channel 58 about the rivet 62 until the rearward edge 52c abuts the center portion 55 of the leg support 50. To position the transparency viewer 20 at an angle of approximately 70° relative to horizontal as in FIG. 12, each long leg 53 is extended by pivoting it downwardly out of the channel 58 about the rivet 67 until the rearward edge 53c abuts the center portion 55 of the leg support 50.

Means may be provided by way of key slots 83 in leg assemblies 47 and 48 for mounting the transparency viewer on an upright surface, such as wall 84 into which a nail 86 or similar anchored retainer has been driven. The key slot 83 is preferably formed adjacent the free end 53b of the leg 53. To prevent the leg 53 from pivoting about the rivet 67 when the transparency viewer 20 is hung on the wall 84, a screw (not shown) is threaded into one of the side walls 59 and 60 of the leg support 50 and into one of the side walls 69 and 70 of the leg 53. As a result, the transparency viewer 20 can be arranged in a vertical position as shown in FIG. 13 or can be positioned at an angle approximately 15° from vertical by extending the legs 52 as shown in FIG. 14.

2. Frame Assembly for Utilizing the Transparency Viewer in Combination

The frame assembly 22 includes a base 100 having a U-shaped cross-section, an upright support 101 having a U-shaped cross-section, and a bracing member 103 connected between the base 100 and the upright 101 to afford strength and structural support therefor. The base 100 has a forward end 100a and a rearward end 100b. The upright support 101 has a lower end 101a secured to the base 100 at a point intermediate the ends 100a and 100b, and is inclined rearwardly at an angle of approximately 70° so that its upper end 101b, overlies the rearward end 100b of the base 100. The base 100 has a forward portion 100c between its forward end 100a and the bracing member 103 of sufficient length to support the horizontal viewer 20a. Similarly, the upright support 101 has an upper portion 101c between its upper end 101b and the member 103 of sufficient length to support the uprightly inclined viewer 20b. Secured to the underside of the center wall portion 105 of the base 100 adjacent the ends 100a and 100b by screws 107 are resilient pads, or grommets 108, which act as feet to support the base 100 on a supporting surface.

As best seen in FIG. 10, when the frame assembly 22 is utilized, the leg supports 50 of the viewer 20a are of a size and shape to be nestably positioned within the channels 110 defined by side walls 111 and 112 of the base 100. The side walls 111 and 112 are spaced apart sufficiently so that a leg support 50 may be easily inserted into the channel 110. The side walls 111 and 112 have a height such that when the leg support 50 is inserted within the channel 110, the grommets 75 and 76 abut the interior of the center wall portion 105 with the ends of the side walls 111 and 112 spaced from the bottom wall 26 of the housing 24. A knurled thumbscrew 115 inserted through an aperture 115a formed in the center portion 105 of the base 100 is threaded into a suitably aligned threaded aperture 117 positioned adjacent rivet 67 and formed in the center portion of leg 53. Thus the thumbscrews 115 releasably secure each of the frame assemblies 22 to the leg assemblies 47 and 48 of each viewer 20a and 20b to support the viewers in the manner shown in FIG. 1. Similar thumbscrews 115 are provided for the upright supports 101 of each frame assembly 22 so as to retain viewer 20b in upright position in the manner previously described. Thus it is understood that two frame members 100 (FIG. 9) support the transparency viewers 20a and 20b.

Referring again to the frame assembly 100 of FIG. 9, each such assembly preferably has location pins 105a, 105b, and 105c secured with U-shaped base 100 and U-shaped support 101. These pins are positioned so that the supporting rubber grommets of each leg assembly 47 and 48 bear against the pins when the leg assemblies are properly positioned with respect to the frame assemblies 22. Such proper positioning aligns each thumbscrew 115 with aperture 115a and threaded aperture 117 to facilitate the securement of frame assemblies 22 to viewers 20a and 20b.

3. Transparency Viewer Overlay and Film Retaining Clips

The retaining brackets 34 and 35 secure the translucent sheet 32 to the housing 24. The brackets 34 and 35 are configured to have mounting portions 34a and 35a, respectively, secured to the housing and longitudinally extending portions 34b and 35b, respectively, overlying and spaced from the translucent sheet 32 so as to define along the forward and rearward edges of the translucent sheet 32 respective open longitudinal channels 130a and 130b, which are collectively designated 130.

As seen in FIGS. 1 and 3, an overlay device, generally designated 131, may be positioned against the translucent sheet 32 by moving the overlay device 131 into the respective channels 130, the ends of which are preferably open. The overlay 131 releasably holds a plurality of relatively stiff photographic slides 132. As shown herein, the slides are of similar size; however, the overlay device may be adjustably structurally arranged to accommodate slides of varying sizes. The slides 132 typically have a transparency film surrounded by a cardboard border.

The overlay 131 is preferably made up of a series of parallel, similarly constructed elongate members 135 which are connected at each end thereof to frame members 137 and 138, respectively, by screws 139 so that the elongate members 135 are held in fixed relation.

As seen in FIG. 16, each of the elongate members 135 is preferably of extruded aluminum and is configured to define a pair of longitudinal open channels 141 and 142, respectively. The open longitudinal channel 141 is defined by a forward wall 144, a rearward wall 145 spaced from the forward wall 144, and a bottom wall 146. The open longitudinal channel 142 is defined by a relatively short depending forward wall 148, a rearward wall 149 spaced from the forward wall 148, and a bottom wall 150 which faces in opposed relation to the bottom wall 146 and preferably is offset forwardly therefrom when the overlay device 131 is positioned as shown in FIG. 16. Thus channel 142 is preferably positioned forwardly of the channel 141 so that a transparency slide 132 will be held in tilted position with its upper edge forward of its lower edge (FIG. 16). Stated another way, when the overlay device 131 is positioned as in FIG. 3, the upper edge of a slide 132 will be tilted upwardly and occupy a position above that of the lower edge of a slide 132.

The channels 141 and 142 extend continuously between the oppositely disposed frame members 137 and 138. Resilient material 155, which may be of foam rubber or foamed plastic such as polyurethane, is disposed preferably within the open channel 141. Herein, the resilient material 155 preferably has a width greater than the distance between the walls 144 and 145 so that when material 155 is compressed and inserted within each of the channels 141, the inherent resiliency of the material is sufficient to effect functional engagement with each of the walls 144 and 145 to retain the resilient material 155 firmly in place.

It should be appreciated that the cross-sectional shape or configuration of the resilient material 155 may take a variety of forms to accommodate varying cross-sectional shapes of channel 141. It is also contemplated that the resilent material may be adhered in place.

As can best be seen in FIG. 16, the open channel 141 of one elongate member 135 faces, i.e., opens toward, the open channel 142 of the preceding elongate member in the series. The distance between the exposed surface of the resilient material 155 and the wall 150 of the opposed open channel 142 of an adjacent elongate member 135 is arranged to be less than the height of the transparency slide or slides 132 which are to be placed between two adjacent elongate members 135.

To place a slide in secure position in the overlay device 131, the slide is inserted into the open channel 141 by compressing the resilient material 155 of one elongate member 135 and then the upper end of the slide (FIG. 16) is positioned within the channel 142 of the adjacent elongate member 135. The inherent resiliency of the resilient material 155 maintains each slide 132 firmly in position on the overlay device. Thus the slides remain in their preselected position even if the overlay device 131 is tipped throughout 360°, or knocked over, or jarred when placed in storage position in a cabinet enclosure. These features are important where considerable time has been consumed in editing and sorting slides for a business, medical, or educational presentation.

Referring again to resilient material 155, it is within the concept of the present invention that such material be positioned in either channel 141 or 142, and also, that such material 155 may be positioned within both adjacent channels 141 and 142.

As best seen in FIG. 16, narrow, screw-receiving longitudinal concavities 158 are defined in each elongate member 135 by the bottom wall 146, the rearward wall 149 and wall 159. The cross-section of each concavity is of a size to securely receive the screws 139. Each of the frame members 137 and 138 has a plurality of stamped protrusions 161 each of which is positioned to precisely locate an end of each of the elongate members 135 when the overlay device is being assembled. As best seen in FIG. 16 and FIG. 17, each protrusion 161 extends onto an end of channel 141 so as to maintain proper orientation of the elongate members relative to frame members 137 and 138 during assembly. To prevent marring of the translucent sheet 32, padding or tape 165 is secured to each of the elongate members 135 along the rear surface of the rearward wall 145.

As seen in FIGS. 15–18, the overlay 131 has relatively narrow lower and upper marginal edge portions, generally designated 170 and 171, respectively. As seen in FIG. 3, the lower and upper marginal edges 170 and 171 are positioned rearwardly and forwardly, respectively. The overlay 131, when retained adjacent the translucent sheet 32, has the respective marginal edge portions 170 and 171 inserted into the channels 130a and 130b defined by the brackets 34 and 35. The overlay 131 is of such size to span the surface of the translucent sheet 32 so that both marginal edges 170 and 171 may simultaneously reside in both of the channels 130. The marginal edges 170 and 171 have cross-sectional configurations generally similar to those of the respective channels 130 into which they may be positioned. As best seen in FIG. 17, the upper edge portion 171 is slightly longer than the lower edge portion 170. Thus, the overlay 131 may be positioned over the translucent sheet 32 in contacting relation therewith by either of two methods. The overlay 131 may be inserted from a lateral edge of the viewer 10 so that the edge portions 170 and 171 are inserted simultaneously into the open ends of the channels 130. Alternatively, the overlay 131 may be tilted slightly to insert the entire upper edge portion 171 into the channel 130b and then moving the overlay 131 back against the translucent sheet 32 and finally moving the overlay 131 toward the channel 130a to insert the entire smaller lower edge portion 170 therein. The relative spacing between the channels 130 prevent the upper edge portion 171 from moving completely out of the channel 130b. As a result, the overlay 131 fits into and is retained in the channels 130. Consequently, the viewer 20 may be positioned in any desired orientation, some of which are illustrated in FIGS. 1, 2, and 11–14. Referring again to FIGS. 15–18, the lower marginal edge portion 170 is defined by the rearward wall 149 and the wall 159 of the lowermost elongate member 135. The upper marginal edge portion 171 of the overlay 131 is defined by the forward wall 144 and the rearward wall 145 of the uppermost elongate member 135.

Referring to FIGS. 1, 4, and 5, a film retaining clip 180 is illustrated. The retaining clip 180 is configured so that the base mounting portion may be properly placed within the channel 130. The clip 180 as will be seen is adapted to retain large transparencies 182 such as photographic negatives of X-rays, which are flexible and are less rigid than the transparency slides 132. The retaining clip 180 is a spring clip and is generally U-shaped with arcuate legs 184 and 185. The base of the retaining clip 180 has a configuration similar to that of the channels 130 so that the clip when compressed may be inserted therein and be movably longitudinally therealong. The lower leg 184 has an upturned end 187 permitting the transparencies 182 to be inserted between the clip 180 and the translucent sheet 32 with some ease. When a transparency is slid under the lower leg 184, the lower leg 184 is cammed upwardly. Because of the inherent resiliency of the retaining clip 180, the transparency 182 is held in place firmly against the upper surface 37 of the translucent sheet 32. The overhanging portion 34b, 35b of the channel 130 is provided with a longitudinally disposed groove 88 in which segment 190 of the upper leg 185 of the retaining clip 180 seats so as to prevent the retaining clip 180 from moving out of the channel 130 along the translucent sheet 32 while permitting movement longitudinally of the brackets 34 and 35.

Manual deflection of the upper leg 185 downwardly toward the translucent sheet 32 to disengage the raised segment 190 from the groove 188 permits removal of the mounting portion of the retaining clip 180 from the channel 130. The upper leg 185 is bent upwardly away from the lower leg 184 so that the upper leg 185 may be deflected downwardly toward the lower leg 184 sufficiently to permit removal of the retaining clip 180 without interfering with the lower leg 184. The retaining clip 180 may also be removed by sliding it laterally outward from the open end of the channel 130. The grooves 188 formed in the depending wall portions 34b and 35b do not interfere with the placement of the marginal edges 170 and 171 of the overlay 131 into the channels 130. As should be apparent, any number of retaining clips may be placed into the channels 130 at any position desired.

In addition to the advantages provided by the overlay device itself and its unique coaction with the transparency viewer, the present invention provides a highly versatile unit in use. The viewer may be made portable and its low profile enhances the potential areas of use. Furthermore, the viewer affords structure adapting it for a plurality of uses with the translucent illuminated sheet capable of being disposed in a multitude of convenient viewing positions.

I claim:

1. A system for viewing transparencies and the like, comprising: a viewer provided with a housing formed of peripheral side walls including spaced apart forward and rearward walls and spaced apart lateral walls closed by a bottom surface and a top translucent viewing surface secured to said housing to afford an inner chamber for illuminating means within said housing to illuminate said translucent top surface, and means secured to said housing and spaced above said translucent top surface for defining opposed longitudinal open channels at the forward and rearward edges of said translucent top surface; an overlay adapted to hold transparencies or the like therein and having generally parallel forward and rearward marginal edges, said overlay edges having a cross-sectional configuration generally similar to the cross-sectional configuration of said channels and being spaced apart sufficiently to allow them to be simultaneously positioned in said channels, said channels having open lateral ends so that said overlay may be held in position in contact with said translucent top surface by inserting said overlay edges into said channels at the lateral open ends thereof; and a retaining clip having a mounting portion and an operating portion, said mounting portion having a cross-sectional configuration generally similar to the cross-sectional configuration of said channels to allow it to be positioned in said channels with said operating portion being held against said translucent top surface so that a transparency inserted therebetween is retained against said translucent top surface, and whereby said overlay or one or more retaining clips may be selectively used with said viewer as desired.

2. The transparency viewing system of claim 1 wherein said defining means includes a pair of brackets, a first bracket having a mounting portion secured to said forward wall adjacent the upper end thereof and having a depending portion extending from its mounting portion and spaced above said translucent top surface to define one of said open channels, a second bracket having a mounting portion secured to said rearward wall adjacent the upper end thereof and having a depending portion extending from its mounting portion and spaced above said translucent top surface to define the other of said open channels, whereby the side walls of said channels are defined by said translucent top surface and the respective depending portions of said brackets.

3. The transparency viewing system of claim 2 wherein said translucent top surface is positioned on the upper ends of said forward and rearward walls of said housing, and further including means defined by said bracket for holding said translucent top surface against said upper ends to fixedly secure said translucent top surface to said housing.

4. The transparency viewing system of claim 2 wherein said channels have a generally U-shaped cross-sectional configuration and said overlay edges have a similar cross-sectional configuration permitting insertion thereof into said channels.

5. The transparency viewing system of claim 2 wherein said depending portion of each of said brackets defines a groove in the side wall of said channel and said retaining clip has a projection adapted to reside in said groove when said retaining clip is inserted into said channel to maintain said clip in said channel.

6. The transparency viewing system of claim 5 wherein said retaining clip is a spring clip having spaced apart side walls with an inherent spacing greater than the space defined between the channel side walls, said spring clip being compressed for insertion into either of said channels, the inherent resiliency of said retaining clip maintaining said operating portion in contact with said translucent top surface.

7. A system for viewing transparencies and the like, comprising: a viewer including a housing having a relatively flat translucent surface defining a portion thereof, illuminating means within said housing for illuminating said translucent surface, said translucent surface having opposing lateral end margins and spaced apart, generally parallel, longitudinal edge portions, and means adjacent each longitudinal edge portion of said translucent surface for defining an open channel; an overlay device adapted to hold transparencies therein, said overlay device having a width sufficient to span the distance between said channels and having longitudinal marginal edges adapted to fit within the respective channels so that said overlay device may be positioned over said translucent top surface whereby said overlay device is retained in adjacent relation by inserting the longitudinal marginal edges of said overlay device into said channels; and one or more retaining clips which may be inserted into either of said channels, each of said clips having one portion configured to be positioned in either of said channels and another portion held against said translucent top surface, whereby transparencies inserted between said clip and said translucent top surface are resiliently retained.

8. An apparatus for use in viewing transparencies and the like, comprising: a viewer provided with a housing formed of peripheral side walls including spaced apart forward and rearward walls and spaced apart lateral walls closed by a bottom surface and a top translucent viewing surface secured to said housing to afford an inner chamber for illuminating means within said housing to illuminate said translucent top surface, means secured to said housing and spaced above said translucent top surface for defining opposed longitudinal open channels at the forward and rearward edges of said translucent top surface; and an overlay adapted to hold transparencies or the like therein and having generally parallel forward and rearward marginal edges, said edges of the overlay having a cross-sectional configuration generally similar to the cross-sectional configuration of said channels and being spaced apart sufficiently to allow them to be simultaneously positioned in said channels, said channels having open lateral ends so that said overlay may be held in position in contact with said translucent top surface by inserting said overlay edges into said channels at the lateral open ends thereof.

9. An apparatus as claimed in claim 8 wherein said means for defining said channels includes a pair of brackets, a first one of said brackets having a mounting portion secured to said forward wall adjacent the upper end thereof and having a depending portion extending from its mounting portion and spaced above said translucent top surface to define one of said open channels, a second one of said brackets having a mounting portion secured to said rearward wall adjacent the upper end thereof and having a depending portion extending from its mounting portion and spaced above said translucent top surface to define the other of said open channels, whereby the side walls of said channels are defined by said translucent top surface and the respective depending portions of said brackets.

10. An apparatus as claimed in claim 9 wherein said translucent top surface is positioned on the upper ends of said forward and rearward walls of said housing, and wherein said brackets have means for holding said translucent top surface against said upper ends to fixedly secure said translucent top surface to said housing.

11. An apparatus as claimed in claim 9 wherein said channels have a generally U-shaped cross-sectional configuration and said overlay edges have a similar cross-sectional configuration permitting insertion thereof into said channels.

12. An apparatus for use in viewing transparencies and the like, comprising: a viewer provided with a housing formed of peripheral side walls including spaced apart forward and rearward walls and spaced apart lateral walls closed by a bottom surface and a top translucent viewing surface secured to said housing to afford an inner chamber for illuminating means within said housing to illuminate said translucent top surface, means secured to said housing and spaced above said translucent top surface for defining opposed longitudinal open channels at the forward and rearward edges of said translucent top surface; and at least one retaining clip having a mounting portion and an operating portion, said mounting portion having a cross-sectional configuration generally similar to the cross-sectional configuration of said channels to allow said mounting portion to be positioned in one of said channels with said operating portion being held against said translucent top surface so that a transparency inserted therebetween is retained against said translucent top surface, and whereby one or more retaining clips may be selectively used with said viewer as desired.

13. An apparatus as claimed in claim 12 wherein said means for defining said channels includes a pair of brackets, a first one of said brackets having a mounting portion secured to said forward wall adjacent the upper end thereof and having a depending portion extending from its mounting portion and spaced above said translucent top surface to define one of said open channels, a second one of said brakets having a mounting portion secured to said rearward wall adjacent the upper end thereof and having a depending portion extending from its mounting portion and spaced above said translucent top surface to define the other of said open channels, whereby the side walls of said channels are defined by said translucent top surface and the respective depending portions of said brackets.

14. An apparatus as claimed in claim 13 wherein said depending portion of each of said brackets defines a groove in the side wall of said channel and said retaining clip has a projection adapted to nest in said groove when said retaining clip is inserted into said channel to maintain said clip in said channel.

15. An apparatus as claimed in claim 13 wherein said retaining clip is a spring clip having spaced apart side walls with an inherent spacing greater than the space defined between the channel side walls, said spring clip being compressed for insertion into either of said channels, the inherent resiliency of said retaining clip maintaining said operating portion in contact with said translucent top surface.

16. An apparatus for viewing transparencies and the like, comprising: a viewer including a housing having a relatively flat translucent surface defining a portion thereof, illuminating means within said housing for illuminating said translucent surface, said translucent surface having opposing lateral end margins and spaced apart, generally parallel, longitudinal edge portions, and means adjacent each longitudinal edge portion of said translucent surface for defining an open channel; and an overlay device adapted to hold transparencies therein, said overlay device having a width sufficient to span the distance between said channels and having longitudinal marginal edges adapted to fit within the respective channels so that said overlay device may be positioned over said translucent top surface whereby said overlay device is retained in adjacent relation by inserting the longitudinal marginal edges of said overlay device into said channels.

17. An apparatus for viewing transparencies and the like, comprising: a viewer including a housing having a relatively flat translucent surface defining a portion thereof, illuminating means within said housing for illuminating said translucent surface, said translucent surface having opposing lateral end margins and spaced apart, generally parallel, longitudinal edge portions, and means adjacent each longitudinal edge portion of said translucent surface for defining an open channel; and at least one retaining clip inserted into either of said channels, said clip having one portion configured to be positioned in either of said channels and another portion held against said translucent top surface, whereby transparencies inserted between said clip and said translucent top surface are resiliently retained.

* * * * *